(12) United States Patent
Hyldahl et al.

(10) Patent No.: US 6,356,342 B1
(45) Date of Patent: Mar. 12, 2002

(54) METHOD AND APPARATUS FOR ILLUMINATION OF LIGHT-SENSITIVE MATERIALS (75) Inventors: Heidi Marianne Hyldahl; Hans Peter Ballegaard, both of Lystrup; Niels Buus, Mundelstrup, all of (DK)

(73) Assignee: Purup-Eskofot A/S, Ballerup (DK)

( * ) Notice: Subject to any disclaimer, the term of this patent is extended or adjusted under 35 U.S.C. 154(b) by 0 days.

(21) Appl. No.: 09/180,253
(22) PCT Filed: May 7, 1997
(86) PCT No.: PCT/DK97/00214
§ 371 Date: Aug. 23, 1999
§ 102(e) Date: Aug. 23, 1999
(87) PCT Pub. No.: WO97/42596
PCT Pub. Date: Nov. 13, 1997

(30) Foreign Application Priority Data

May 7, 1996 (DK) .................. 549/96
May 23, 1996 (DK) .................. 601/96

(51) Int. Cl.⁷ .............. G03B 27/32; G02B 26/08
(52) U.S. Cl. ............... 355/77; 359/196; 359/197; 359/204
(58) Field of Search ............ 355/77; 250/235, 250/236; 347/116, 118, 119, 134, 232, 233, 259; 358/515; 359/196, 197, 204, 209, 210, 212, 216, 223, 226; 385/1

(56) References Cited

U.S. PATENT DOCUMENTS

| 4,871,231 A | * | 10/1989 | Garcia, Jr. .................. 359/478 |
| 4,962,312 A | * | 10/1990 | Matuura et al. ............. 250/236 |
| 5,233,188 A | * | 8/1993 | Arimoto et al. ............. 250/235 |
| 5,305,022 A | * | 4/1994 | Ota et al. .................... 357/233 |
| 5,363,217 A | | 11/1994 | Keightley .................... 358/506 |
| 5,485,194 A | | 1/1996 | Tateoka ....................... 347/232 |
| 5,570,223 A | * | 10/1996 | Harig ........................... 359/204 |
| 5,697,006 A | * | 12/1997 | Taguchi et al. ............. 396/330 |
| 5,802,222 A | * | 9/1998 | Rasch et al. .................... 385/1 |
| 6,011,250 A | * | 1/2000 | Minakuchi et al. ......... 250/205 |
| 6,031,561 A | * | 2/2000 | Narayan et al. ............. 347/255 |

FOREIGN PATENT DOCUMENTS

| EP | 0 529 918 A1 | 3/1993 |
| EP | 0 589 652 A1 | 3/1994 |
| JP | 60-222817 | 11/1985 |
| JP | 07214803 | 8/1995 |
| WO | WO 92/14609 | 9/1992 |

* cited by examiner

Primary Examiner—Russell Adams
Assistant Examiner—Rodney Fuller
(74) Attorney, Agent, or Firm—Pitney, Hardin, Kipp & Szuch LLP (57) ABSTRACT A method and an apparatus for exposing light-sensitive materials, including a first light beam conducted from a light source with the wavelength $\lambda_1$ to a first exposure point on the light-sensitive material via an optical system. This system has at least one input end and one output end as well as at least one reflecting or transmitting rotating optical element arranged relatively to the optical output end, wherein at least one additional light source generates an additional light beam with a wavelength $\lambda_x$ which is different from $\lambda_1$. The additional light beam with the wavelength $\lambda_x$ is conducted via the input end of the optical system to the output end of the optical system, so as to be geometrically coincident with the first light beam at the output end of the optical system, the additional light beam being conducted from there to an additional exposure point on the light-sensitive material inside the image setter drum in dependence on $\lambda_x$ or the mutual difference between the wavelength $\Delta\lambda$, said light beams being conducted completely or partly from the input end of the optical system via one or more light guides, preferably optical fibers, to the output end of the optical system.

15 Claims, 5 Drawing Sheets

METHOD AND APPARATUS FOR ILLUMINATION OF LIGHT-SENSITIVE MATERIALS

FIELD OF THE ART

The invention relates to a method of exposing light-sensitive materials as stated in the introductory portion of claim 1, and to an apparatus for performing the method as stated in the introductory portion of claim 13.

EP 0 589 652 A describes a so-called single raster scanning system (ROS) having a rotating mirror in which a rotating polygonal mirror reflects a "bundle" of laser beams with different wavelengths. The laser beams are very close to each other (10 µm), but still spatially separated perpendicularly to the axis of rotation of the polygon (fast scan direction), and are split by means of optical filters to optical paths to the associated photo-receptors.

This spatial separation, however, is problemetic in several different connections, since the mechanical structure of the optical system will invariably have an increased complexity, and at worst involves a deterioration of precision and possible exposure resolution.

U.S. Pat. No. 4,962,312 discloses a multi-station printer in which a plurality of light beams with different wavelengths is gathered to a beam by means of a beam splitter and is then conducted to the stations of the printer via a polygon, in dependence on the wavelengths of the light beams.

A serious drawback of this system, however, is that it may be difficult to achieve the necessary coincident optical axes by using beam splitters per se. This has the additional consequence that the system gets more expensive and complex if a reasonable result should be desired.

A further drawback of this structure is that the light beams may be affected critically by temperature gradients, turbulence, etc.

SUMMARY OF THE INVENTION

When at least one additional light source generates in additional light beam with a wavelength $\lambda_x$ which is different from $\lambda_1$, said additional light beam with the wavelength $\lambda_x$ being conducted via the input end of the optical system to the output end of the optical system so as to be geometrically coincident with the first light beam at the output end of the optical system, said additional light beam being conducted from there to an additional exposure point on the light-sensitive material in dependence on $\lambda_x$ or the mutual difference between the wavelengths $\Delta\lambda$, said light being conducted completely or partly from the input end of the optical system via one or more light guides, preferably optical fibres, to the output end of the optical system, it is possible to optimize the exposure rate, as the necessary mechanical movement between output end and exposure point may be reduced to a minimum. It should moreover be noted that the method may be adapted to the nature and the rate of the mutual movement in a simple manner, thereby allowing the method to be preferred on the same apparatus with a different resolution, as the distance between the first exposure point and the additional exposure point or points may be adjusted e.g. by changing the wavelengths of the light sources. The method is thus extremely flexible and may be adapted for many applications without complicated mechanical or electronic measures.

The invention is thus unique in that light with different wavelengths may be missed in an optimum manner in a light guide, or e.g. an optical fibre, to a geometrically coincident light beam, thereby making the subsequent separation simpler.

The use of an output end in the form of a light guide, e.g. an optical fibre, moreover allows simpler adjustment of the output end relative to the rotating optical element, as, physically, a fibre end is much simpler to handle and to position than a beam splitter per se.

Further, it is also possible to exchange the individual laser sources in the complete application separately, without this requiring a new overall calibration of the optical system.

An additional advantage of using light guides or optical fibre means between laser sources and the output end of the optical system is that it is simpler to position laser sources and optional associated modulators in primary consideration of where the mechanical position is most advantageous for the apparatus concerned. This involves a special advantage for general purpose printers or scanners.

It has also been found that this advantage is particularly pronounced for e.g. multi-station printers as it is frequently desired, for cost-saving reasons, to expose different physically separated exposure points, e.g. one exposure point per colour, with just one rotating optical element, for which reason a geometrical separation of the light beams results in a greater mechanical and optical complexity.

It will likewise be appreciated that, according to the invention, the precision may be maintained even at very high speeds of rotation.

Thus by mixing the various light beams with correspondingly different wavelengths so that these are fed geometrically coincidently from the output end of the optical system, it is possible to carry out a relatively uniform and simple optical control via the rotating reflector to the exposure face.

Thus, by avoiding a spatial separation between the beams at the output end of the optical system it is possible, in a simple manner, to avoid the complicated geometrical relations that exist between the output end and the axially rotating reflector or mirror, thereby avoiding e.g. twisting on the exposure face in a simple manner.

The invention thus allows all light beams to be centered on the rotating reflector, thereby obtaining rotary symmetry for the beams which are subsequently reflected by the exposure face, irrespective of the position of the reflector or the mirror in the path of rotation.

From two to several light sources may be used according to the invention.

The light sources used may be both of the same type or of different types.

The optical system comprises the necessary optical features to conduct light from source to exposure point. If the light sources are not modulated directly, the optical system may also comprise optical modulators.

According to the invention, a reflector is taken to mean e.g. a mirror, a pentaprism, or optical elements having a sufficiently deflecting effect.

Further, it is possible to conduct the light to the exposure points via a compact optical arrangement, as the optical system is hereby well-defined and easy to calibrate.

The use of optical fibres in this connection provides an additional advantage, as the spatial distribution of the complete light beam is improved considerably, since the light from the various light sources is coincident if the light from all light sources is conducted precisely to one optical fibre.

An additional advantage obtained by using optical fibres in this connection is that the precision is improved considerably, considering that the optical reflector performs very fast revolutions with consequent turbulent flows around the rotating optical element of the scanner. The use of optical fibres minimizes the optical temperature-sensitive distance, which is particularly imporatant when using multi-beams whose mutual focusing distance on the exposure face is affected critically by temperature gradients.

Moreover, it is possible to arrange heat-generating components suitably relative to e.g. heat-sensitive components. The light source may thus be positioned freely as desired.

When the light is conducted from the individual light sources to a common optical fibre in the optical system via one or more couplers, a particularly advantageous structure of the optical system may be obtained, as an optical coupler causes relatively low optical losses in the mixing of two or more light waves from two or more optical fibres to one optical fibre.

Thus, in several applications, an optical T-coupler will exhibit very low optical losses in the actual mixing.

The optical coupler is particularly advantageous in connection with e.g. general purpose printers, as optical mixing in a coupler is relatively simple and inexpensive, just as it is possible to exchange laser sources separately and to adjust these to the individual input end, without this necessarily calling for overall optical adjustment of the system.

It should be mentioned that within the scope of the invention there are other possibilities of geometrically mixing light beams having several different wavelengths to a combined light beam which contains all these wavelengths.

For example, it may be mentioned that a beam splitter may advantageously be used in several application types using linearly polarized light, as, in many cases, a beam splitter can better maintain the polarization than an optical coupler.

When the light is conducted from the individual light source to an exposure point via the optical system, an optical element with light-splitting properties reflecting or transmitting the light to the exposure point in dependence on the wavelength of the light, an advantageous and preferred embodiment of the invention is obtained, as the combined light signal may be split in a simpler manner into a plurality of differently oriented modulated light signals corresponding to the plurality of light sources with different wavelengths, thereby providing a corresponding plurality of exposure points on the light-sensitive material. The optical element used may e.g. be produced holographically or lithographically according to the intended purpose.

The optical element may thus be a mirror having an integrated optical grating or a grating which transmits the incident light to the exposure points.

It is thus possible to increase the exposure rate in internal drum scanners considerably. As the requirements with respect to the structure of the inner mechanical parts and the system as a whole are very critical for internal drum scanners, the invention is particularly advantageous in this connection, since the invention thus enables a very compact structure of the carriage of the scanner.

When the light beams are separated by means of a grating arranged at the output end of the optical system, thereby making the angle of incidence of the light to the rotating optical reflector and thus the exposure point dependent on the wavelength of the incident light, an alternatively embodiment of the invention is obtained, said embodiment being less exacting with respect to the dimensioning of the optical element.

The use of a transmitting grating in this manner also allows the grating to be oriented perpendicularly to the incident light, which inter alia provides advantages in terms of dimensioning.

When the light is conducted from the individual light source via the optical system to a rotating reflector having a plurality of filter layers, said light being either transmitted to the next filter layer on the reflector or reflected toward an exposure point in dependence on the wavelength, a further and efficient embodiment of the invention is achieved, it being possible to provide the reflectors with a plurality of coating layers having given filter and reflection characteristics.

In this connection an advantage is also obtained with respect to the localization of the exposure points, as minor inaccuracies in the wavelengths of the light sources do not displace the exposure point. This provides advantages in connection with light source dimensioning and light source dimensioning requirements.

The method allows a very well-defined orientation of the split modulated light toward the exposure points, as the split light is conducted in parallel from the reflector to the exposure points at a mutual distance. The distance between the exposure points may hereby be dimensioned uniquely and be determined on the basis of the thickness of the individual filter layers.

This, in principle, makes the localization of the exposure point independent of the distance between reflector and exposure point, thereby facilitating the dimensioning of e.g. focusing optics.

When the light is focused toward the exposure points by means of a focus lens integrated in the optical element, it is possible to focus the modulated light on the light-sensitive material.

When the wavelength of the individual laser light source is measured currently and the wavelength of the laser source is adjusted in dependence on this measurement signal on the basis of a reference wavelength $\lambda_{ref}$ given or desired for the laser light source, an effective control, necessary in several cases, of the wavelength of the light sources is obtained, as even relatively small deviations with respect to the reference wavelength may result in an undesired deviation in the localization of the exposure points.

When the light is modulated in the optical system, it is possible to control the wavelength of the individual light sources in an effective manner, as a non-modulated light source, in the form of e.g. a laser diode, can be maintained more easily on the desired wavelength in the event that the light is modulated outside the laser diode.

When the light is conducted from the individual light source to an exposure point via the optical system, a rotating optical element reflecting or transmitting the light to the exposure point, the light path between light source and exposure point extending through at least one optical element placed in the light path and having focus-changing properties, it is possible to perform splitting or compensation for e.g. the direction and the focusing of the light, which may e.g. be successive.

When an optical compensating element is used, it is also possible to compensate completely or partly for variations in the illumination wavelengths caused by inaccuracies in the illumination sources. Thus, the compensating optical element makes it possible to maintain the focus and the illumination direction geometrically before and/or after splitting of the light, and thereby the mutual distance between the exposure points.

When the light is conducted to the exposure points via at least one compensating optical element with focus-changing properties positioned between light sources and exposure points, said compensating optical element rotating with the rotating optical element, it is possible to obtain a precise focusing of all exposures points on the film, as the compensating optical element compensates for the mutual change in the focusing between the exposure points which is provided by the splitting of the light.

When the compensating optical element rotates with the optical reflecting element, it is ensured that the exposure points do not get twisted, and the mutual position is maintained on the film.

When the light is conducted to the exposure point via at least one optical element with refractive properties positioned between the rotating optical element and the exposure point, said optical element with refractive properties rotating with the rotating optical element, an advantageous embodiment of the invention is achieved.

When the light is conducted from the individual light sources to a common optical fibre in the optical system via a beam splitter, a particularly advantageous embodiment of the invention is achieved, which is particularly pronounced when it is desired to maintain the linear polarized light, as a beam splitter advantageously maintains the polarization during this mixing.

When the apparatus comprises at least one optical diffractive element arranged to split incident light in dependence on the wavelength of the light, the optical diffractive element being adapted to rotate at the same speed of rotation as the rotating optical element to maintain a fixed mutual position between the optical rotating element and the optical diffractive element or elements, it is possible to perform multi-beam illumination with rotation mechanisms or compensation optics or mechanisms.

When the optical diffractive element or elements are formed by optical gratings, a simple embodiment of the invention is achieved.

When the output end of the optical system is formed by a light guide, a particularly advantageous embodiment of the invention is achieved, as the light guide can "contain" or, more particularly, conduct light beams with different wavelengths and modulation in a simple manner in one geometrically coincident transmission.

Light guide is preferably taken to mean an optical fibre, a self guide or the like.

When at least one optical compensation element is arranged between the output end of the optical system and at least one exposure point, so that all light beams with different wavelengths are focused mutually spaced on the exposure face, a special and important embodiment of the invention is achieved, as, according to the invention, said splitting may have as a result that the focus of the individual light beams is not sufficiently close to or coincident with the exposure face, unless simple focus compensation is performed for the light beams concerned.

It should be stressed that the above-mentioned embodiment may also be implemented as a pre-focusing of the light beams, so that these are suitably conducted to the reflector and from there for focusing on the exposure plane.

DRAWINGS

The invention will now be explained more fully below with reference to the drawing, in which.

EXAMPLE

Figure 1:
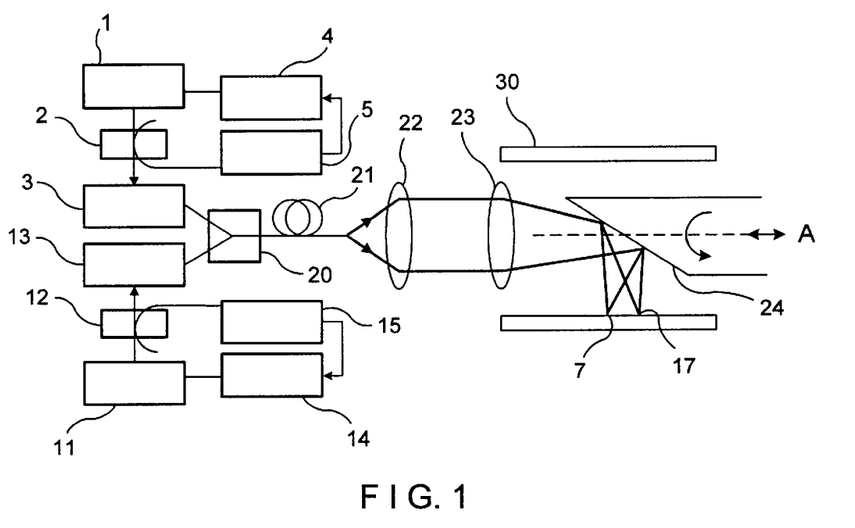
FIG. 1 shows an embodiment of the invention.

FIG. 1 shows a sketch of a preferred embodiment of the invention.

The principle of the present invention is that light beams from at least two light sources having their respective wavelengths are gathered by means of one or more optical couplers and/or beam splitters.

According to the preferred embodiment, the overall optical system consists of an optical system which collimates and optionally cuts the light, as well as a rotating optical system capable of rotating at e.g. 24,000 rpm.

A light source 1 in the form of a laser diode with a wavelength $\lambda_1$ is connected to a first modulator 3, which is in turn connected to an optical coupler 20 formed by a so-called T-coupler.

Correspondingly, a light source 11 in the form of a laser diode with a wavelength $\lambda_2$ is connected to a first modulator 13, which is in turn connected to the above-mentioned T-coupler 20.

The light sources used may e.g. be external cavity lasers with the wavelengths 634.785 nm and 634.355 nm.

The optical coupler 20 is connected via an optical fibre 21 to an optical system consisting of a collimator lens 22 and a focusing lens 23. A rotating mirror 24 is arranged at the output end of the optical system, said mirror being oriented with an axis of rotation that has a uniform spacing from a surrounding light-sensitive material, in this case formed by a film 30. The mirror 24 has an integrated grating structure in the form of a lithographically produced grating.

An alternative to the above-mentioned lithographic production of the grating may be a holographic production.

According to the present embodiment, the light sources 1 and 11 are each formed by a laser diode of the same type. It is preferred in connection with laser diodes of the same type that they emit light with a wavelength which is mutually close.

According to the present embodiment, $\lambda_1$ and $\lambda_2$ are both in the range 620–670 nm, which means that the light sources 1 and 11 are to be driven at different current and temperatures conditions.

The laser light sources 1 and 11 thus emit light with different wavelengths modulated by the modulator 3 and 13. The light is conducted from the modulators 3 and 13 via the optical coupler and the optical fibre 21 to the optical system in the actual scanner, the modulated light with the wavelengths $\lambda_1$ and $\lambda_2$ being mixed in the optical coupler 20 to a gathered light signal in the optical fibre 21.

The light is collimated in a lens and is focused on a rotating mirror 24 by the focus lens.

The optical grating in the mirror 24 is designed with a surface or grating structure so that the incident light is refracted in dependence on the wavelength $\lambda$. As the light incident on the mirror comprises two different wavelengths $\lambda_1$ and $\lambda_2$ according to the present invention, the light will be refracted and reflected in two light signals directed toward two different exposure points on the film 30, as, in the case shown, $\lambda_1$ is focused on the exposure point 7 and $\lambda_2$ is focused on the exposure point 17.

If the laser light sources used are of different types, it is preferred according to the invention that $\Delta\lambda$ between the laser sources is relatively great, e.g. 30 nm, as the laser light sources can hereby be driven at the same temperature and current conditions.

FIG. 1 additionally shows two couplers 2 and 12 connected to the light sources 1 and 11, each of said couplers being connected to a measuring unit 5 and 15 in the form of so-called wave power meters.

The measuring units 5 and 15 are moreover connected to control units 4 and 14, which are coupled back to the light sources 1 and 11.

The function of the feedback current described above is as follows:

The measuring units 5 and 15 register the wavelength and power of each light source 1 and 11, and this registration subsequently causes the control units 4 and 14 to iteratively apply control signals to the light sources 1 and 11.

The registration of the wavelengths $\lambda_1$ and $\lambda_2$ is compared in the control unit with a desired preset reference value $\lambda_{ref1}$ and $\lambda_{ref2}$, and then the wavelengths $\lambda_1$ and $\lambda_2$ of the light sources are adjusted in response to this comparison. Control algorithms and control parameters are selected on the basis of knowledge of the laser sources used, the actual control of the laser sources being primarily performed thermoelectrically and/or by means of the diode current according to the preferred embodiment.

Figure 2:
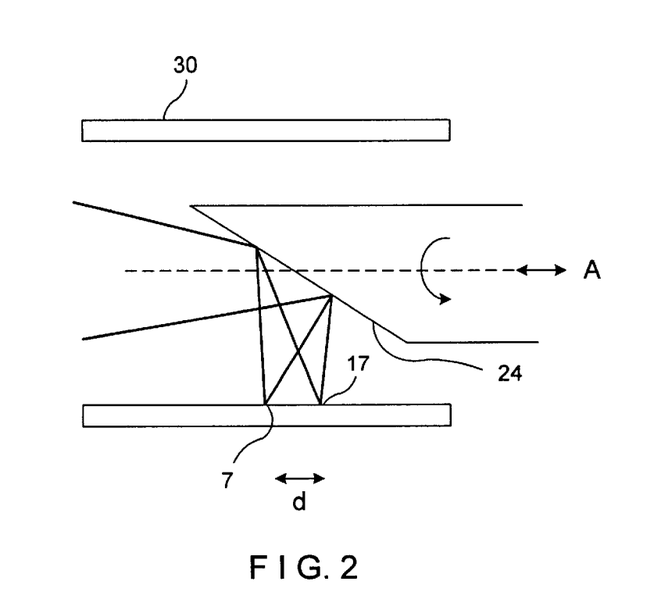
FIG. 2 shows a detail of the embodiment shown in FIG. 1, and FIGS. 3–8 show additional embodiments of the invention.

FIG. 2 shows how the two exposure points 7 and 17 have a mutual spacing d. Since the rotating mirror is mounted on a carriage (not shown) which moves in an axial direction relative to the rotation of the mirror, it is important that the mutual spacing between the exposure points 7 and 17 is adapted to the travelling speed of the carriage and the rotation of the mirror.

It is intended according to the present embodiment that the spacing d between the exposure points is approximately half the distance travelled by the carriage during precisely one rotation in an axial direction. If several light sources are used, this ratio is correspondingly different. In principle, the mutual spacing d may be varied according to the desired resolution and carriage speed corresponding thereto by dynamically changing one of the laser source wavelengths or both of them.

It should be noted in this concentration that this facility imparts flexibility to the overall system, as the possible resolutions in this multi-beam system may be obtained by control-technical features, without changing mechanical or hardware properties or set-up.

In practice, the mutual spacing d may e.g. be 320 $\mu$m with a suitable corresponding spot diameter.

Figure 3:
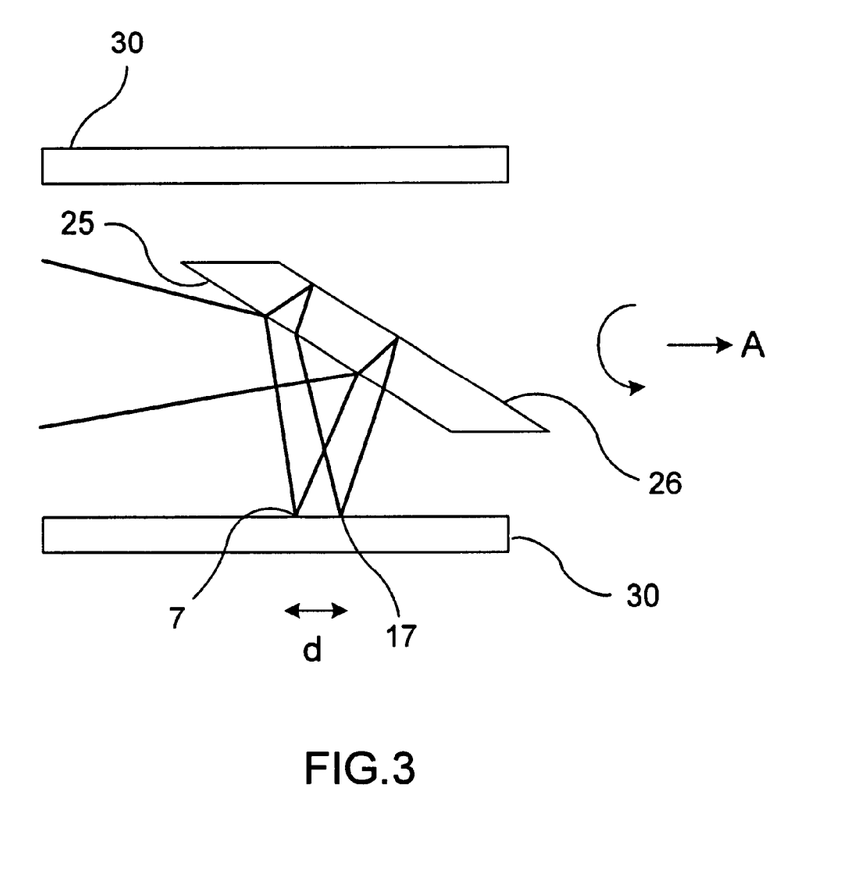

FIG. 3 shows a further embodiment of the invention, where the rotating mirror in the embodiment shown in FIG. 1 is replaced by a rotating beam splitter comprising two filter layers 25 and 26 which each reflect part of the total light amount to the film 30.

The filter layer 25 in the present embodiment thus has a reflecting effect for the light signal with one wavelength, for which reason the light signal is reflected to the exposure point 7, while the light signal with the other wavelength is transmitted further on to the reflecting surface 26, from which it is reflected to the exposure point 17.

If more than the two light sources with different wavelengths used in this case are employed, the number of filter layers must be increased correspondingly, as this splitting by means of filter layers can define a large number of exposure points in a simple manner, the spacing d between the exposure points being defined by the mutual spacing between the filter layers in the axial direction.

Figure 4:
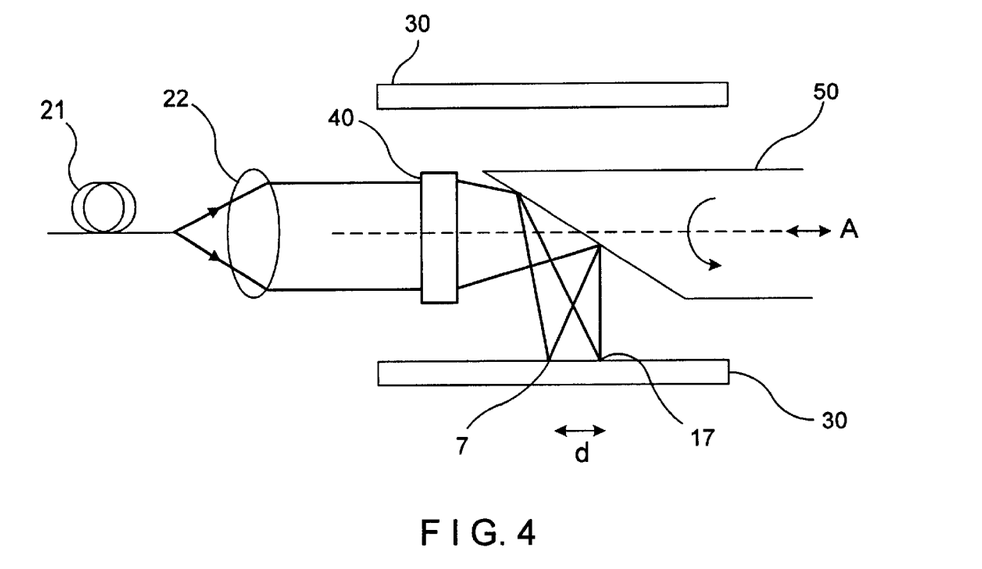

FIG. 4 shows a further embodiment where two light sources (not shown) generate light with two different wavelengths to an optical fibre 21, which conducts light via a collimation lens 22 through a compensating optical element 40, from which the light is conducted via a rotating optical reflecting element 50 to exposure points 7 and 17 on a film 30.

The compensating optical element 40 rotates with the optical reflecting element 50, so that the exposure points 7 and 17 are not twisted and the mutual position is maintained on the film 30.

The inserted holographic optical element 40 serves to ensure that both exposure points 7 and 17 are focused correctly on the film 30 after splitting from the optical reflecting element 50.

Figure 5:
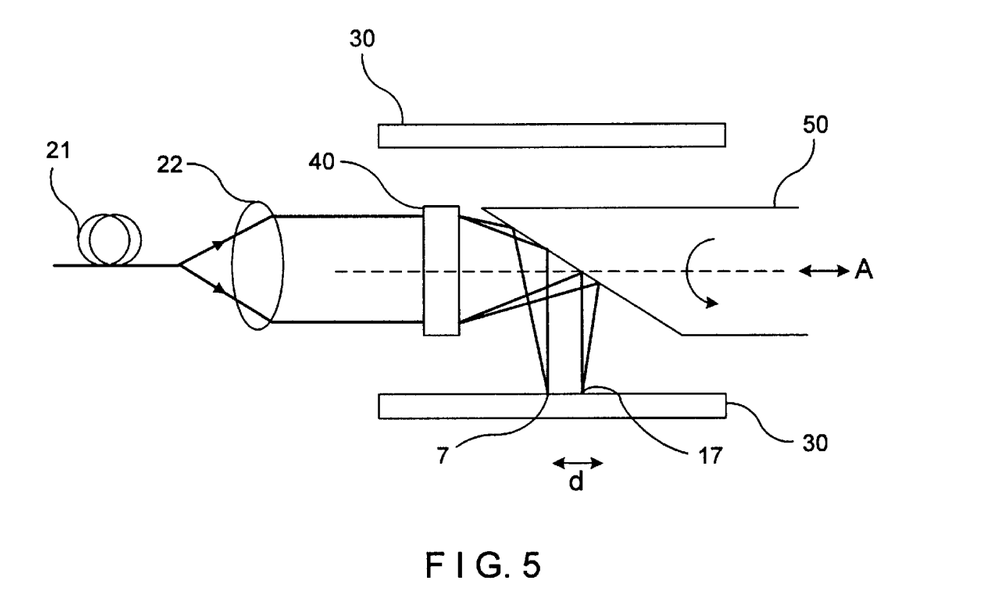

FIG. 5 shows a further embodiment where an optical element 40 splits the incident light, and where an optical reflecting element 50 focuses the light correctly on the film, said element 50 compensating for the movement or distortion of the focus on the exposure points 7 and 17 which the optical element 40 provides by said splitting.

Figure 6:
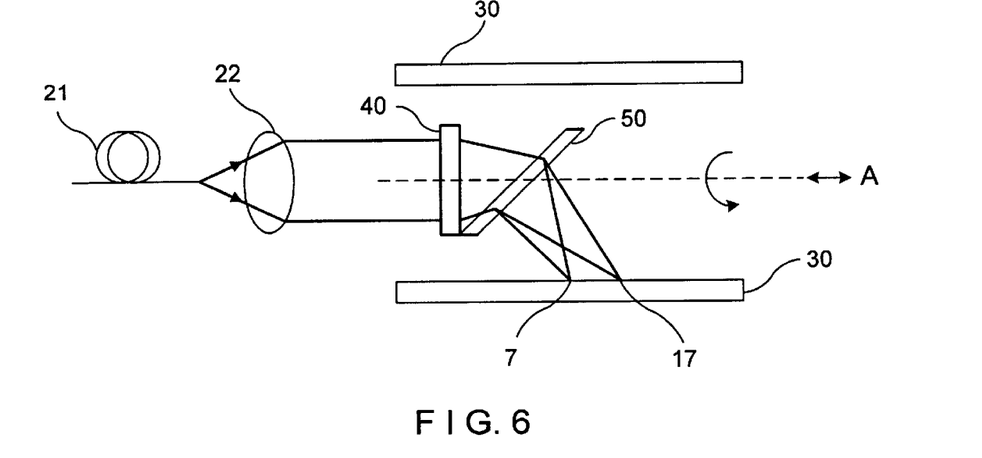

FIG. 6 shows a further embodiment of the invention, which has the same overall functionality as the embodiments shown in FIGS. 4 and 5.

According to this embodiment, however, the optical element 50 is formed by a transmitting holographic element which splits and conducts incident light toward two exposure points 7 and 17 in dependence on the wavelength of the light. A compensating transmitting optical element 40 is interposed between the optical fibre 21 and the optical element 50, ensuring that the light is conducted toward the optical element 50 at an angle which provides a correct focusing of both exposure points 7 and 17.

The optical compensating element 40 thus compensates for the change in focusing points provided by the optical element 50.

Figure 7:
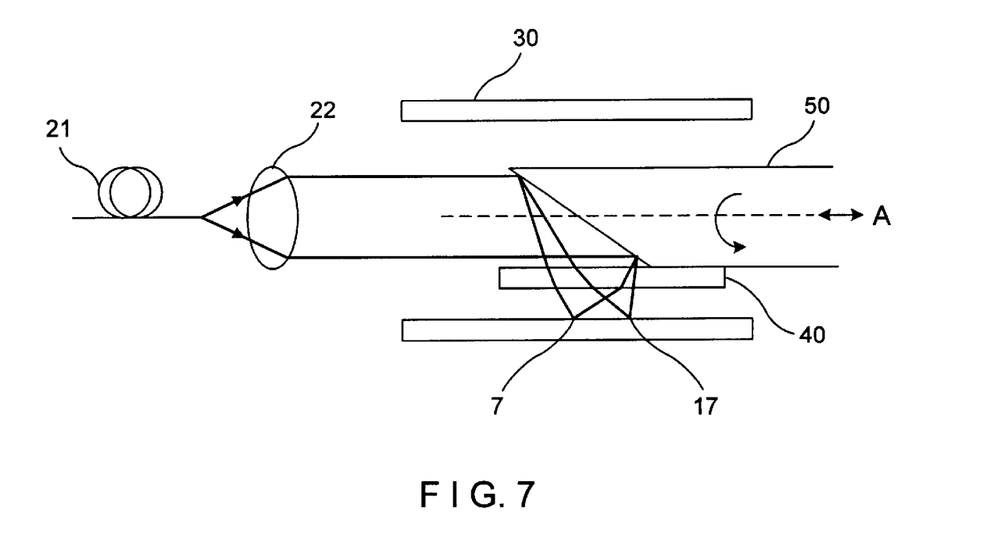

FIG. 7 shows a further embodiment of the invention, where an optical element 50 in this case is formed by a reflecting mirror having an integrated grating structure, which ensures splitting of the incident light in dependence on wavelength.

Since the focusing of the exposure points 7 and 17 do not coincide with the surface of the film 30, a compensating optical element 40 is likewise inserted, ensuring that the focusing coincides with the film 30.

Figure 8:
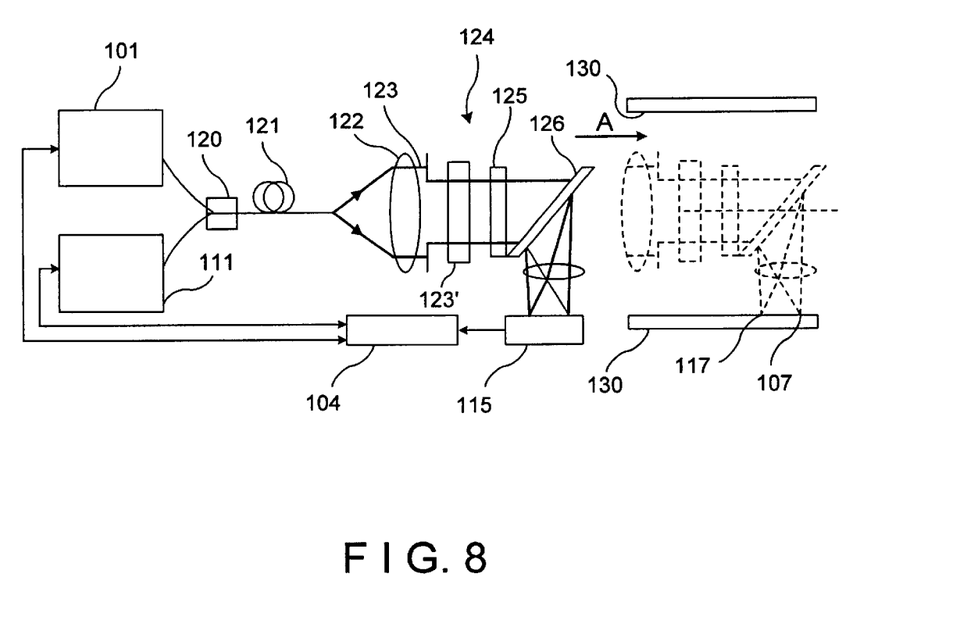

FIG. 8 shows a further embodiment of the invention where two external cavity lasers 101 and 111 with the wavelength 634.785 nm and 634.355 nm conduct light to an optical coupler 120, which may advantageously be formed by a beam splitter in several cases in spite of the inherent higher optical loss of such a splitter, and then the light is conducted via an optical coupler 120 to an optical fibre 121, which forms the output end of the optical system.

According to a preferred embodiment of the invention, the laser sources used must be capable of being varied in the wavelength range 634–636 nm, just as the line width should be narrower than 0.01 nm for an 8 $\mu$m spot to be made on the film.

The laser sources must likewise be capable of maintaining a given wavelength within +/– 0.0003 nm (223 MHz), since the spacing between the two spots on the film is to be kept within +/– 0.5 $\mu$m.

The laser sources must additionally be pigtailed to a polarization-maintaining fibre so that the fibre output is linearly polarized.

The output end of the optical system, or in this case the fibre 121, subsequently conducts both light beams geometrically coincidentally to collimation optics 122 and an iris 123 and from there to a rotating optical system 124.

The iris 123 is used for spot size adjustment.

A quarter-wave plate 123' which converts the linearly polarized light emerging from the output end of the optical fibre into circularly polarized light, is provided after the iris 123.

The rotating optical system 124 is rotated at a speed of rotation of 24,000 by means not shown.

According to the invention, the rotating optical system comprises a rotating window 125 whose function is to protect the rotating diffractive optical element against turbulent destruction and dusting. The window may e.g. be formed in BK7 with a thickness of 1.626 mm.

The heart of the rotating optical system 124 is subsequently formed by a rotating diffractive optical element 126, which comprises a grating substrate and a grating positioned on the rear side of the grating substrate. The grating substrate may e.g. be made of a plane piece of silica glass which is 3 mm thick.

The concretely used grating consists of 2184 grooves/ lines which are etched in the grating surface by means of photolithography.

Subsequently, the rotating optical system comprises an achromat whose function is to focus the two separated beams, which have their separate wavelengths, down on the exposure face 130. The achromat e.g. has a focal length of 238.9 mm and must be as thin as possible.

The collimation optics may e.g. be formed by a collimation achromat of the type S&H f200 achromat. This achromat is movable so that it may be moved closer to/further away from the output end of the optical fibre 121, thereby permitting the focal length to be adjusted, which in turn makes it possible to allow for the various thicknesses of the light-sensitive materials to be exposed.

The rotating optical system is arranged on a carriage (not shown), which may in turn be moved under the control of a control unit capable of performing a movement in the direction of the arrow A. The output end of the optical system, i.e. the optical fibre 121, is mounted on a carriage at a substantially fixed distance between the output end and the rotating optical system, while light sources and associated control units are stationary.

Thus, the optical system 124 may be reciprocated inside the internal cavity 125 under control and conduct illumination beams to the internal exposure face 130 of the image setter on the exposure points 107 and 117.

The mutual spacing between the exposure points may e.g. be 320 $\mu$m.

Also, as shown in FIG. 8, the optical system 124 may be moved to an initiation position where the exposure points 107, 117 are passed to a so-called PSD 115 (Position Sensing Device) capable of registering the optical power of the two spots and their positions and transmitting these registered data to a control unit 104.

The control unit 104, which is also connected to the light sources 101 and 111, can thus modulate image data suitably on the basis of introduced control algorithms, added image data and the registration of the PSD 115, so that one or more runs of the carriage (not shown) provide a total image on the exposure face.

Part of this data processing takes place according to known principles via an RIP (Raster Image Processor not shown), which generates the necessary data sequences which are subsequently fed via a buffer to the laser sources 101, 111 which are thus modulated in dependence on these. Another ready alternative may of course be to feed these data sequence to a separate modulator if the laser sources are not modulated directly.

If the illustrated system e.g. was to be built with four light sources, each of which has its own wavelengths, and consequently four simultaneous separate exposure points on the exposure face, the wavelengths may e.g. have a mutual difference of 0.43 nm: 634 nm, 355 nm, 634.785 nm, 635.215 nm and 635.645 nm.

These four wavelengths can give four spots on the film, each of which is separated by 320 $\mu$m.

What is claimed is:

1. A method of exposing light-sensitive materials, such as films and printing plates, by means of modulated light, wherein a first light beam is conducted from a light source with the wavelength $\lambda_1$ to a first exposure point on the light-sensitive material via an optical system comprising at least one input end and one output end as well as at least one optical rotating reflecting or transmitting element arranged relatively to the optical output end, wherein at least one additional light source generates an additional light beam with a wavelength $\lambda_x$ which is different from $\lambda_1$, said additional light beam with the wavelength $\lambda_x$ being conducted via the input end of the optical system to the output end of the optical system so as to be geometrically coincident with the first light beam, said additional light beam being conducted from the output end of the optical system to an additional exposure point on the light-sensitive material in dependence on $\lambda_x$ or on the difference between wavelengths $\lambda_1$ and $\lambda_x$, wherein the light beams are conducted from the individual light source to an exposure point through optical fibers via the optical system, wherein a rotating optical element with wavelength-splitting properties reflects or transmits the light to the exposure point in dependence on the wavelength of the light.

2. A method according to claim 1 wherein the light beams are conducted from the individual light sources to a common optical fiber in the optical system via at least one optical coupler.

3. A method according to claim 1 wherein the light beams are separated by a grating arranged at the output end of the optical system, thereby making the angle of incidence of the light to the rotating optical reflector and thus the exposure point dependent on the wavelength of the incident light.

4. A method according to claim 1 wherein the light beams are conducted from the individual light source via the optical system to an optical element in the form of a rotating reflector having a plurality of filter layers, said light being either transmitted to the next filter layer on the reflector or reflected toward an exposure point in dependence on the wavelength.

5. A method according to claim 1 wherein the light beams are focused toward the exposure points by a focus lens integrated into the optical element.

6. A method according to claim 1 wherein the wavelength of the individual light source is currently measured, and that the wavelength of the source in adjusted in dependence on this measurement signal on the basis of a given or desired reference wavelength $\lambda_{ref}$ of the individual light sources.

7. A method according to claim 1 wherein the light beams are modulated in the optical system.

8. A method according to claim 1 wherein the light beams are conducted from the individual light source to the exposure point via the optical system, a rotating optical element reflecting or transmitting the light to the exposure point, the light path between the light source and exposure point extending through at least one optical compensating element with refractive properties positioned in the light path.

9. A method according to claim 1 wherein the light beams are conducted to the exposure points via at least one compensating optical element with focus-changing properties positioned between light sources and exposure points, said compensating optical element rotating with the rotating optical element.

10. A method according to claim 1, wherein the light beams are conducted to the exposure point via at least one optical element with splitting properties positioned between the rotating optical element and the exposure point, said optical element with splitting properties rotating with the rotating optical element.

11. A method according to claim 1 wherein the light beams are conducted from the individual light sources to a common optical fiber in the optical system via a beam splitter.

12. A multi-beam scanner for performing the method according to claim 1 wherein the apparatus comprises at least one optical diffractive element arranged to split incident light in dependence on the wavelength of the light, the optical diffractive element being adapted to rotate at the same speed of rotation as the rotating optical element to maintain a fixed mutual position between the optical rotating element and the optical diffractive element or elements.

13. A multi-beam scanner according to claim 12 wherein the optical diffractive element is formed by an optical grating.

14. A multi-beam scanner according to claim 12 wherein the output end of the optical system is formed by a light guide including optical fiber means.

15. A multi-beam scanner according to claim 12 wherein at least one optical compensation element is arranged between the output end of the optical system and at least one exposure point, whereby all light beams with different wavelengths are focused mutually spaced on the exposure face.

* * * * *